US008160749B2

(12) United States Patent
Donaldson et al.

(10) Patent No.: US 8,160,749 B2
(45) Date of Patent: Apr. 17, 2012

(54) ENERGY CONSERVATION SYSTEM (76) Inventors: David Donaldson, Grosse Pointe City, MI (US); Brad Comyns, Viejo, CA (US)

(\*) Notice: Subject to any disclaimer, the term of this patent is extended or adjusted under 35 U.S.C. 154(b) by 620 days.

(21) Appl. No.: 12/341,688

(22) Filed: Dec. 22, 2008

(65) Prior Publication Data

US 2009/0171506 A1 Jul. 2, 2009

Related U.S. Application Data (60) Provisional application No. 61/015,406, filed on Dec. 20, 2007.

(51) Int. Cl.
*G01M 1/38* (2006.01)
*G05D 3/12* (2006.01)
*G05D 23/00* (2006.01)
*G05B 23/02* (2006.01)

(52) U.S. Cl. ............ 700/276; 700/22; 700/295; 236/51; 340/3.1; 340/3.8

(58) Field of Classification Search .................... 700/22, 700/275–278, 295, 297; 236/51; 340/3.1, 340/3.8
See application file for complete search history.

(56) References Cited

U.S. PATENT DOCUMENTS

| 2,693,591 | A | | 11/1954 | Morse |
| 4,057,840 | A | | 11/1977 | Wingo |
| 4,058,740 | A | | 11/1977 | Dalton et al. |
| 4,101,886 | A | \* | 7/1978 | Grimes et al. ................ 165/237 |
| 4,223,301 | A | | 9/1980 | Grimes et al. |
| 4,293,026 | A | | 10/1981 | Day |
| 4,315,596 | A | | 2/1982 | Johnson, Jr. et al. |
| 4,585,162 | A | | 4/1986 | Evans |
| 5,206,521 | A | | 4/1993 | Ruiz et al. |
| 5,224,648 | A | \* | 7/1993 | Simon et al. .................... 236/51 |
| 5,395,042 | A | \* | 3/1995 | Riley et al. .................. 236/46 R |
| 5,620,137 | A | | 4/1997 | Coelho et al. |
| 5,933,085 | A | \* | 8/1999 | Holcomb et al. ............ 340/5.66 |
| 6,097,290 | A | | 8/2000 | Balfour |
| 6,536,675 | B1 | | 3/2003 | Pesko et al. |
| 6,700,224 | B2 | \* | 3/2004 | Biskup et al. ................. 307/116 |
| 6,792,319 | B1 | \* | 9/2004 | Bilger ............................ 700/13 |
| 2004/0083128 | A1 | | 4/2004 | Buckingham et al. |
| 2006/0164205 | A1 | | 7/2006 | Buckingham et al. |

FOREIGN PATENT DOCUMENTS

| CN | 201032714 Y | 3/2008 |
| CN | 101320261 A | 12/2008 |
| WO | WO-02065673 A2 | 8/2002 |

\* cited by examiner

*Primary Examiner* — Sean Shechtman
(74) *Attorney, Agent, or Firm* — Patent Procurement Services (57) ABSTRACT

An energy conservation system is provided to lower energy consumption in an unoccupied room. A master controller provides control of power consumption to an occupant of a room through an occupant action to create an occupied mode and otherwise be in an unoccupied mode. A thermostat is controlled by the master controller. A master radio frequency transceiver is located within the master controller and a second radio frequency transceiver remote from the master radio frequency transceiver is provided. The second radio frequency transceiver is coupled to an electrical switching circuit responsive to a radio frequency signal received from the master radio frequency transceiver. A controlled power device is coupled to the electrical switching circuit such that an energy input to the device is controlled by the master controller in the unoccupied mode.

14 Claims, 9 Drawing Sheets

ENERGY CONSERVATION SYSTEM

This application claims priority benefit of U.S. Provisional Application Ser. No. 61/015,406 filed 20 Dec. 2007; the contents of which are hereby incorporated by reference.

FIELD OF THE INVENTION

The present invention relates generally to energy conservation, and more particularly, to lowering energy consumption in an unoccupied room such as an unoccupied hotel room, apartment, condominium, or residence.

BACKGROUND OF THE INVENTION

As the environmental and economic costs of energy consumption become more apparent increasing attention has been paid to energy conservation. Energy conservation not only saves the consumer money, but also limits the societal need for additional power generation facilities and their associated economic and environmental costs. In conserving energy, the least drastic behavioral measures are associated with eliminating wasted consumption; consumption that affords the consumer little, if any, benefit.

The lodging industry maintains large numbers of self-contained rooms each having separate thermostats and electrical outlets. A lodging patron often leaves a room for hours at a time in a state of high energy consumption through climate control settings and operation of electrical appliances and lights. The patron often has little concern for reducing energy consumption in a paid lodging. In such an instance, the lodging patron, absent from the room, derives no benefit from additional energy consumption. Energy consumption represents 3 to 6 percent of the gross revenue in the lodging industry. Additionally, renters of apartments and people who reside in condominiums and residences also have the opportunity to significantly reduce power consumption, but may lack financial incentive to do so.

The predominate method of occupancy control across the world is with the use of the room keycard. Quality properties in Europe and Asia have been using keycard occupancy control for years. However, many of these systems are hardwired. This prior art attempts to limit energy consumption in vacant or unoccupied lodging rooms utilizing a door keycard inserted into an electrical controller. The electrical controller of this prior art system required retrofitting hardwired systems that control electrical switches within the room. The labor and room downtime associated with such a hardwiring retrofit has limited the acceptance of this prior art system. Thus, there exists a need for a lodging energy conservation system that will operate without resort to a hardwired installation of a master controller and controlled electrical power sources.

SUMMARY OF THE INVENTION

The present invention provides an energy conservation system primarily for the purpose of lowering energy consumption in an unoccupied room within a lodging facility or other forms of living areas. The system includes a master controller which houses a radio frequency transceiver and an electrically controlled power consumption device that houses a radio frequency transceiver that is coupled to an electrical switching circuit. When activated, the master controller transmits a frequency that is received by the remote receiver slave device. The received signal causes the switching circuit to connect to an energy source thereby providing power to an appliance connected to the controlled power device. After successful receipt of the radio frequency command from the master controller to the remote receiver slave device a verification of received command is rebroadcast via a radio frequency to the master controller.

Preferably, the housings of the master controller and the controlled power device are dimensioned for installation within a conventional switch electrical box. In one implementation, the controller housing includes a keycard slot adapted to allow the controller to be activated by a room occupant upon entering a room by inserting a keycard into the slot. Conversely, the controller is deactivated when the keycard is removed from the slot. Also, another version of the master controller does not require the insertion of a keycard but it instead activates the same functions by the use of a toggle switch that mimics the operation of the keycard use. Another method would allow room occupancy to be determined by means of motion detection. This motion detection may or may not include passive infrared (PIR), Microwave or Ultrasonic sensing device.

The radio frequency transmitter within the controller emits a frequency that is received by the radio frequency receiver that is mounted at a remote location within range of the transmitter. The transmitter and receiver may or may not consist of a transceiver technology to accomplish the desired effect of shedding unused load during an unoccupied room condition.

The receiver activates the electrical switching circuit upon receiving the signal from the master controller. In turn, the activation of the switching circuit causes the controlled power device to be connected to an energy source until the master controller deactivates the slave device.

BRIEF DESCRIPTION OF THE DRAWINGS

As used herein "FIG." is an abbreviated from of figure and used synonymously.

DETAILED DESCRIPTION OF THE PREFERRED EMBODIMENTS

The present invention has utility in conserving electrical energy in a vacant or unoccupied room. While the present invention as detailed herein is described with respect to a lodging guest room, it is appreciated to also be operative in the settings illustratively including hospitals, warehouses, commercial spaces, apartments, condominiums and residences.

The present invention has a master controller that upon activation by an occupant energizes a remote switching circuit that causes energy to be supplied to a controlled power device from an energy source that illustratively includes a natural gas feed; an electrical source; or water supply line. A controlled power device may include an electrical outlet; a climate-control component such as a thermostat or HVAC system; an electrical switch; a solenoid controlled valve; or the like. The master controller activates the switching circuit that is remote there from by sending a radio frequency (RF) signal to an RF receiver coupled to a switch circuit that in turn connects the energy source. The present invention operates in contrast to the prior art by communicating between the master controller and the remote energy supply sources through a radio frequency signal, as compared to conductive wiring physically forming connections there between.

An inventive energy conservation system offers the option of controlling room HVAC as well as lighting and optional sliding door electrical loads. Through the implementation of a microchip radio frequency communication capability between the master controller and the other system components, there is no need to connect parts with hard wiring and thereby allowing for the retrofitting of a room with inventive system components in a typical room in less than one hour. In contrast to prior art systems based on motion or infrared sensors, the inventive system is free of communication dead spots and lacks the requirement of line of sight communication. As such, the inventive system is particularly well suited for a multi-room suite. By way of illustration, a seventy-five foot communicative radius through wall structure is optionable with an inventive system. It is appreciated that an inventive system provides energy conservation savings of typically between twenty-five and fifty percent as compared to a conventional lodging room and also provides additional savings in extending the operational life time of HVAC, lighting elements in televisions. Still further advantages are afforded through the use of a guest key or mini key activated master entry wall control switch that upon insertion of a card key or mini card key into an inventive system, pre-selected lights within the room are immediately activated affording an additional sense of security. A still further advantage of the inventive system is the reduction in guest room lock outs caused by key cards being left in the room by the patron. Additionally it is appreciated that an inventive system is readily overridden on a room by room basis upon patron request thereby affords a feature unavailable with conventional PIR energy management systems.

Figure 1:
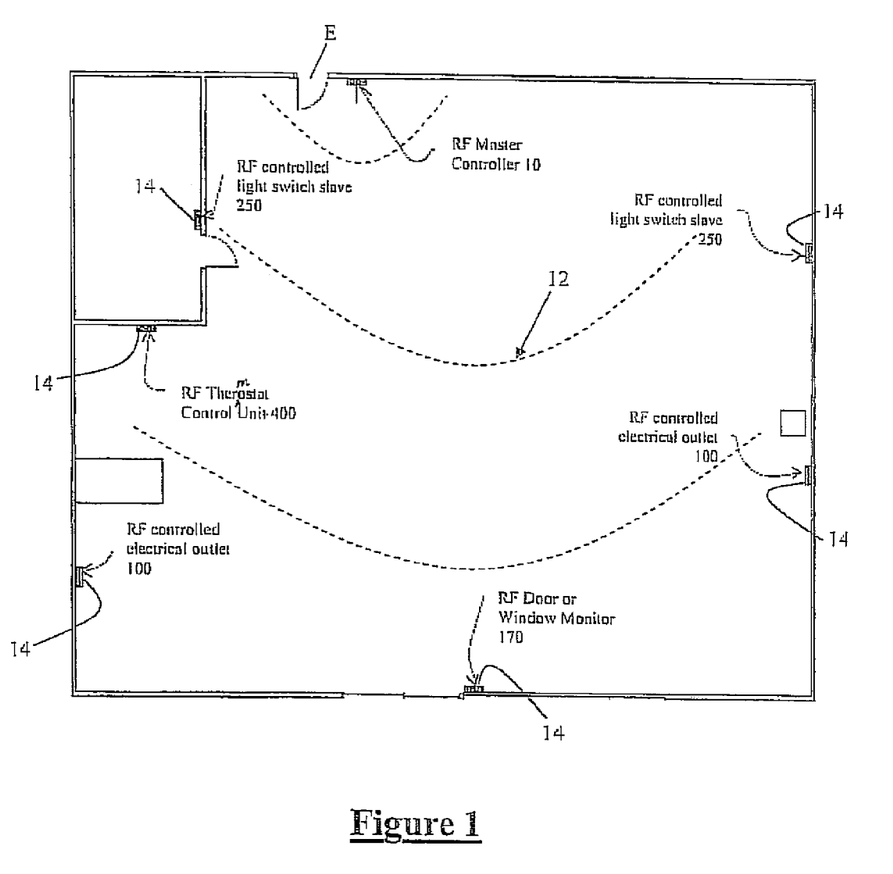
FIG. 1 is a top view of a conventional lodging room fitted with the present invention.
Figure 7:
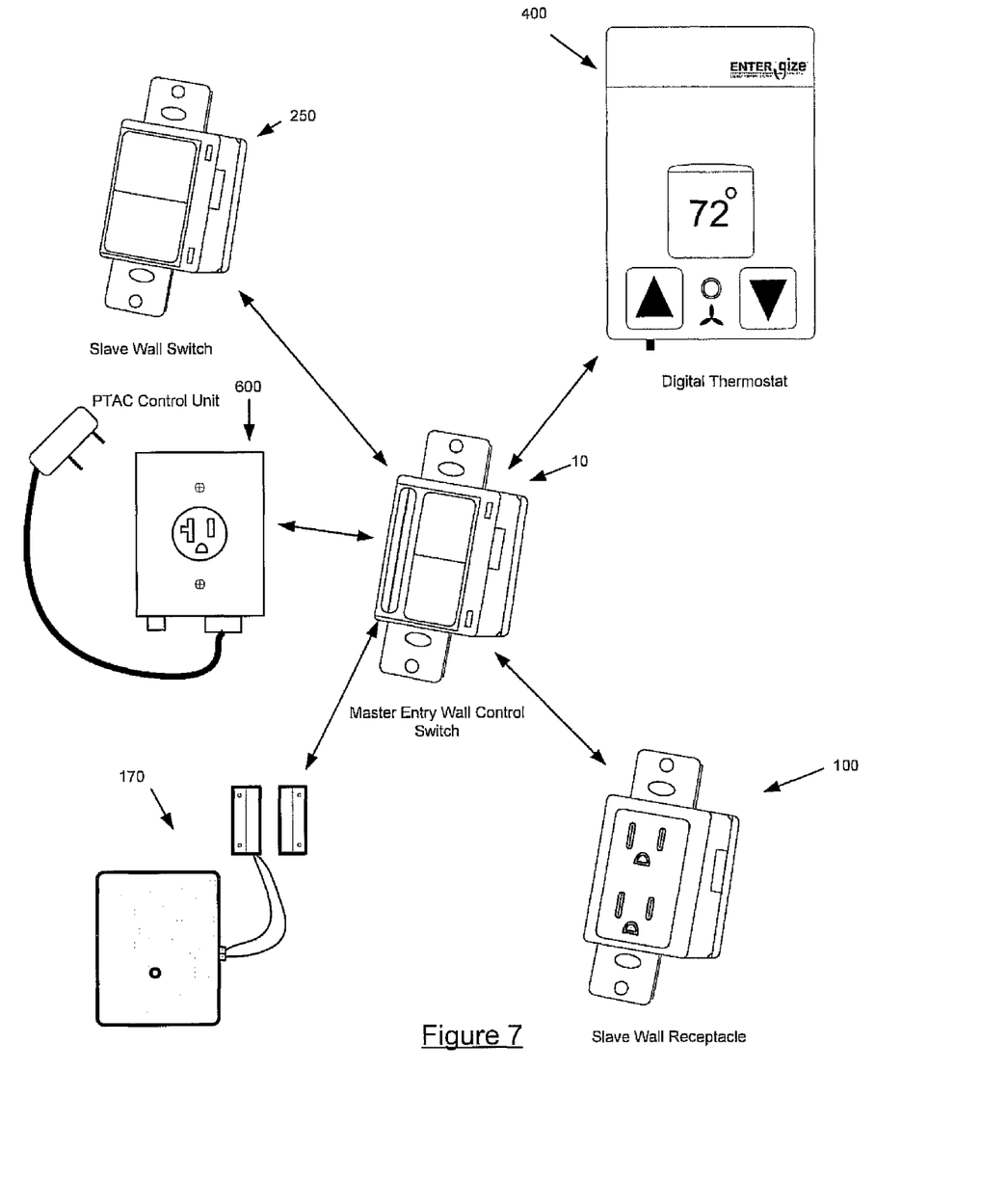
FIG. 7 illustrates a composite schematic of the various components operated by a master controller in an inventive energy conservation system.

Referring now to FIG. 1, a master controller 10 of the present invention is mounted within a conventional lodging facility room. Preferably, the master controller 10 is mounted proximal to the room entryway E. The master controller 10 is activated by a room occupant action. In addition to the preferred activation through magnetic key card insert or mini-key card insert into controller 10; or moving a door slide switch; other room occupant actions illustratively include flipping a switch, producing a thermal signature, voice activation or touchpad activation. The activated master controller 10 emits a radio frequency 12 over a broadcast range encompassing remote RF receivers within a predetermined area. A broadcast range of 50-70 feet is typical in a lodging setting where the master controller radio frequency need only broadcast to tuned RF receivers within a lodging room or suite. In other applications the broadcast range can be increased. The RF 12 is received by at least one RE receiver 14 located within the broadcast range of the master controller 10. The RF receiver 14 is remote from the master controller 10 and coupled to an electrical switching circuit that when activated causes an energy source to be coupled to a controlled power device. As depicted in FIGS. 1 and 7, the RF receiver 14 can be coupled to an electrical outlet (synonymously a wall plug) 100, a wall light switch 250, thermostat control unit 400, door or window opening monitor 170, or a PTAC control unit 600.

Figure 2:
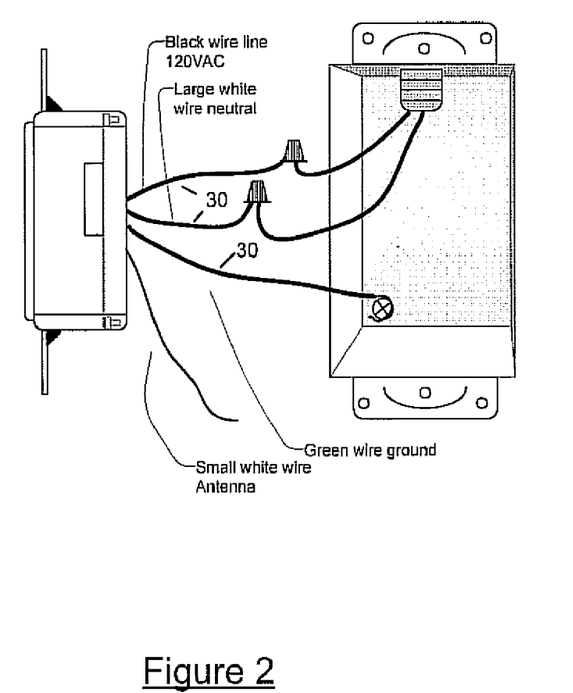
FIG. 2 illustrates various views of an electrical outlet according to the present invention.

FIG. 2 illustrates various views of a controlled power device, namely the slave electrical outlet 100 (or dual receptacle), wherein the switching circuit includes a SPST relay coupled to the RF receiver via a processor and bipolar transistor. It is appreciated that additional energy or power sources in the lodging setting also include electrical switches, HVAC components such as thermostats, solenoid controlled valves, internet and cable TV jacks, and the like. The electrical outlet 100 has an RF receiver and deactivating circuitry. In FIG. 2, the electrical outlet 100 according to the present invention has conventional receptacle apertures 102 adapted to receive a conventional electrical plug. A flange 104 having an aperture 106 is adapted to secure to a conventional electrical box by way of a fastener. The outlet 100 is defined by a first housing portion 108 and a second housing portion 110. The first housing portion 108 can have an electrically insulating plate 112, beneath which electrical contacts 114 are provided for an electrical plug inserted there through.

A radio frequency receiver is attached to the plate 112. Preferably, the radio frequency receiver is provided with frequency controlling switches 138 intended to frequency code the radio frequency receiver with the radio frequency signal emitted by the radio frequency transmitter of the master controller 10. In this way, proximate rooms are coded differently to avoid RF signaling interference. This method of frequency coding is not the only method of frequency coding. Other methods may be employed. A power supply for the radio frequency receiver is also provided. Upon the radio frequency receiver receiving a signal from the master controller 10, a switching circuit activates the conductive pathway through conductors 114.

It is appreciated that in the embodiment depicted in FIG. 2, only a single outlet receptacle of the dual receptacle is under the control of radio frequency activation. In this embodiment of an outlet according to the present invention, the conventional outlet receptacle remains active regardless of radio frequency signals and is adapted to control power devices such as a clock or other continuous operation device. The second outlet portion 110 provides complementary conductor portions to conductors 114 located within first portion 108. The first and second portion may be jumpered together such that both portions are activated by the master controller 10. Second portion 110 is also provided with apertures through which electrical wire 30 is received and thereby conductively coupled to the complementary connectors. The slave wall plug 100 automatically shuts off power to electrical devices in electrical communication therewith when the room is unoccupied. Lamps, HVAC and televisions are illustrative of such electrical devices.

Figure 3:
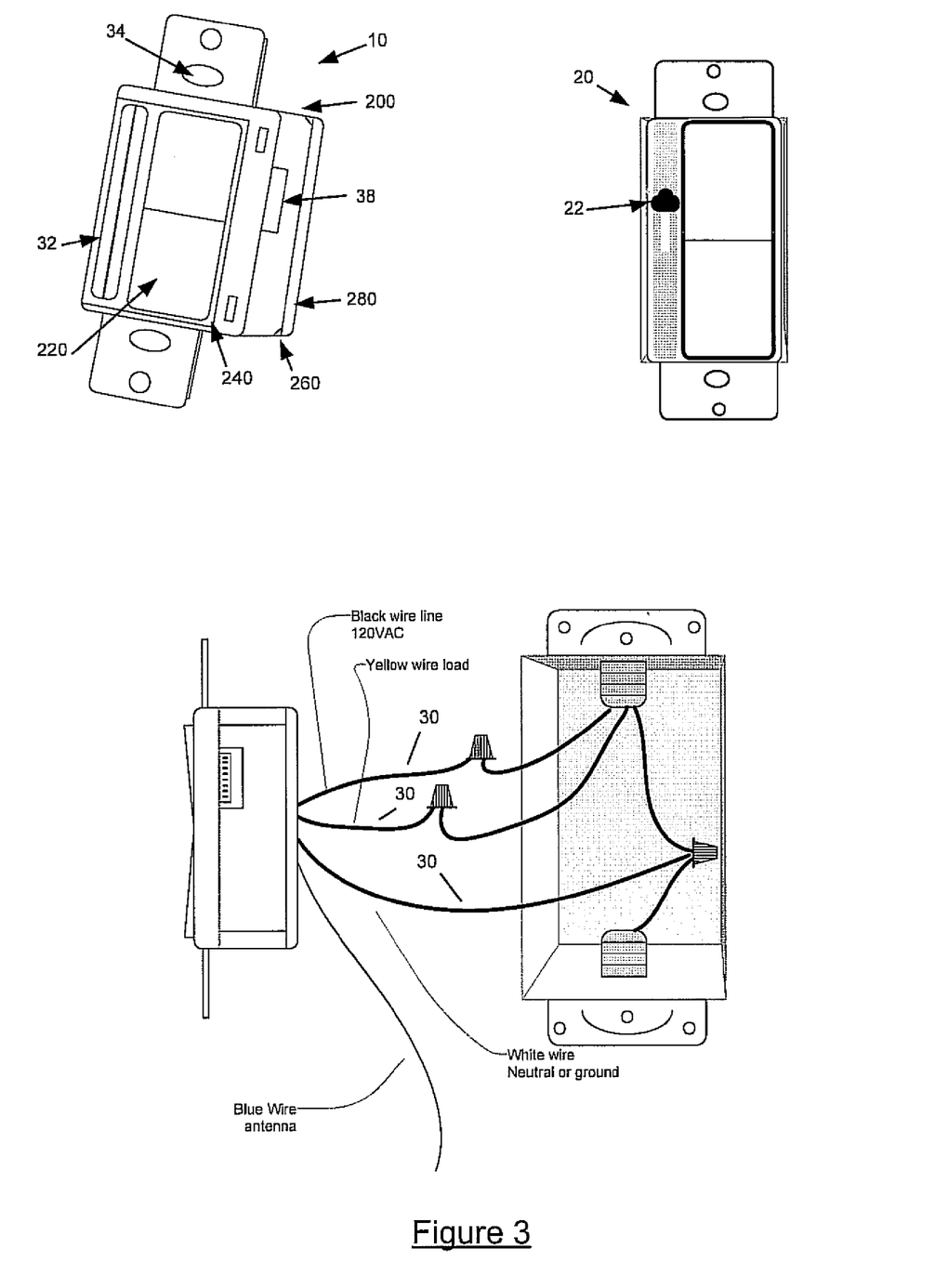
FIG. 3 illustrates various views of a master controller according to the present invention.
Figure 8A:
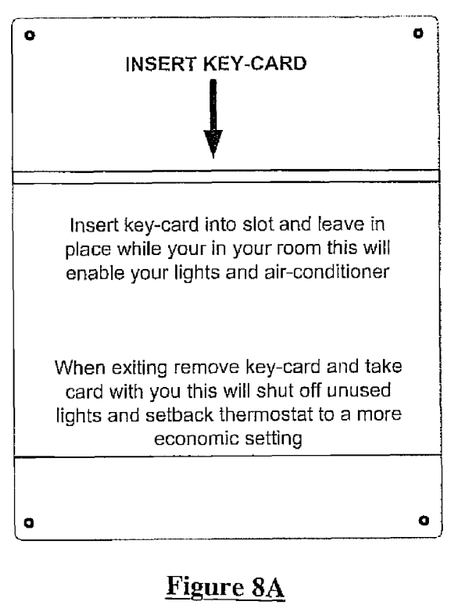
FIGS. 8A-8C illustrate a front view (8A) and a side view (8B) of a keycard or mini keycard receiver to activate a master controller, and a front view (8C) of a door lock switch slider that activates a master controller of an inventive system.

FIG. 3 illustrates a preferred embodiment of a master controller 10 according to the present invention, where like number references among the figures refer to the same component. The master controller 10 as shown in FIG. 3 is incorporated into a conventional wall switch 200, the wall switch having a toggle rocker 220 and a conventional faceplate 240. A master controller front case portion 260 and master controller rear case portion 280 afford a rugged and self-contained unit promoting quick installation within a conventional switch electrical box. Extending from the master controller housing defined by front portion 260 and rear portion 280 are electrical leads 30. Provided within the front portion 260 is an aperture 32 adapted to be in electrical communication with an activation keycard, mini-keycard (FIGS. 8A and 8B) or a door lock slide switch, as shown in FIG. 8C.

In operation, the master controller 10 is positioned such that a patron entering the room inserts a key card or mini key card, or slides a toggle between unoccupied to an occupied position. Preferably, the master controller 10 is eliminated to facilitate key card insertion or toggle movement in a darkened room. Activation of the master controller 10 triggers the radio frequency transmitter therein to set the entire system to the "occupied" mode with the room occupant having normal control over room electrical and HVAC systems. Upon a patron exiting the room, the key card or mini key card is taken from the master controller 10 or the toggle is slide to the "unoccupied" position. After a timed delay of typically between zero and five hundred seconds and preferably between fifteen and seventy-five seconds another radio frequency transmission is sent from the master controller 10 to the slave components of the system to change the settings on the slave components to the "unoccupied" mode thereby placing the HVAC system into pre-selected temperature operating ranges and shutting off electrical outlets and light switches to reduce energy consumption. A sliding door sensor is likewise similarly disabled adding to security while reducing energy consumption.

In one of the applications, the aperture 32 is a translucent light pipe affording illumination of the aperture 32 even in a master controller de-active state in order to facilitate room occupant locating of the aperture 32. In a room inclusive of a door or window monitor 170, as detailed for perspective in FIG. 6 in present, the status of a balcony slide door or window being opened is communicated to the master controller 10 and in the event that a door or balcony slide is left in the open position, preferably shuts off the HVAC system when a door or window is left in an open position. Optionally, the HVAC system is not shut off in the presence of an open door or window until a pre-selected time interval has based. A plurality of light emitting diodes (LEDs) can be located within the housing defined by master controller portions 260 and 280 that provide a long lifetime, low intensity source of illumination. The light source is illustratively a light emitting diode but a phosphor or other illuminate material may be used that allows for the card slot to be visible when a room is dark.

In operation, the master controller 10 is positioned such that a patron entering your room inserts a key card or mini key card, or slides a toggle between unoccupied to an occupied position. Preferably, the master controller 10 is illuminated to facilitate key card insertion or toggle movement in a darkened room. Activation of the master controller 10 triggers the rate of frequency transmitter herein to set the entire system the "occupied" mode with the room occupant now having normal control over room electrical and HVAC systems. Upon a patron exited the room, the key card or mini key card is taken from the master controller 10 or the toggle is slide to the "unoccupied" position. After a time delay of typically between zero and five hundred seconds and preferably between fifteen and seventy-five seconds another radio frequency transmission is sent from the master controller 10 to the slave components of the system to change the settings on the slave components to the "unoccupied" mode thereby placing the HVAC system into pre-selected temperature operating ranges and shutting off electrical outlets and light switches to reduce energy consumption. A sliding door sensor is likewise similarly disabled adding to security while reducing energy consumption.

The faceplate 240 is fitted with a flange 34 adapted to receive at least one fastener for securing the master controller 10 within a conventional switch electrical box. A radio frequency emitting source is provided within the housing portions 260 and 280. Preferably, the radio frequency source is a radio frequency crystal but may be comprised of a combination of passive and active electronic components, a surface acoustic wave circuit, or other transmitter circuits suitable for low-power, close range transmission. More preferably the radio frequency source is provided with a series of coding switches for the setting of the specific frequency modulation. In a room inclusive of a door or a window monitor 170 come as detailed from perspective FIG. 6, the status of a balcony slide door or window being opened is communicated to the master controller 10 and in the event that the door or balcony slide is left in an open position, preferably shuts off the HVAC system when a door or window is left in an open position. Optionally, the HVAC system is not shut-off in the presence of an open door or window until a pre-selected time interval has passed. Radio frequency modulation switches 38 are still more preferably accessible without resort to disassembly of the housing portions 260 and 280. A circuit board can contain conventional electronic components associated with an RF transmitter. It is appreciated that the RF broadcast range of a master controller 10 according to the present invention is affected by factors illustratively including the power input to the RF crystal, the materials the radio frequency must penetrate, and the specific radio frequency of the device. Preferably, a protective flange affords mechanical protection for any exposed switches 38 of the radio frequency source. FIG. 3 also illustrates a master controller 20 wherein an aperture 32 is not included and thus the master controller is not activated by an activation card but by a switch 22.

Figure 4:
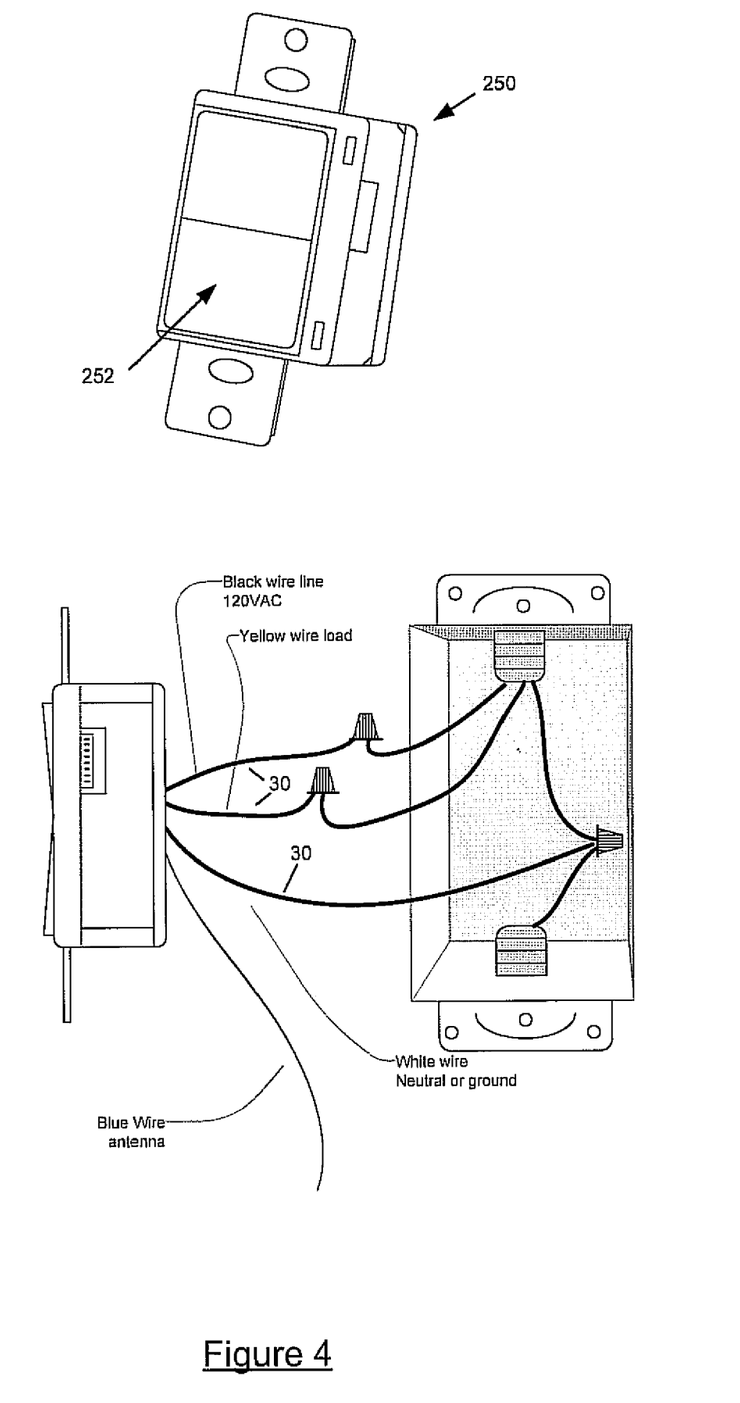
FIG. 4 illustrates various views of a wall switch according to the present invention.

In FIG. 4, a slave wall switch 250 is illustrated wherein the wall switch can automatically energize and de-energize lighting fixtures and electrical outlets that it controls. The wall switch 250 has a toggle switch 252, an RF transceiver and other miniaturized controls including mechanical relays for affording the enabling or disabling of associated lighting fixtures and electrical outlets. In operation, upon receiving an "unoccupied" RF signal from the master controller 10, the wall switch 250 de-energizes associated lighting fixtures and electrical outlets after a predetermined wait time, e.g. 30 seconds. Then, when an occupant enters the room, the wall switch 250 receives an "occupied" RF signal from the master controller 10 and the wall switch 250 re-energizes any associated lighting fixtures and electric outlets that were de-energized when the occupant left the room and the master controller 10 transmitted the "unoccupied" signal. In addition, once the wall switch 250 receives the "occupied" signal from the master controller 10, the switch 250 operates as a normal wall switch until a subsequent "unoccupied" RF signal is received.

While the present invention has been detailed with respect to an RF receiver controlling the energization of an electrical outlet and/or lighting fixtures, it is appreciated that the same RF receiver and switching circuitry can be coupled to other energy sources. In the case of the controlled power device being an HVAC component, it is often preferred not to completely shut down an HVAC system, but rather to switch to an energy conservation mode. An energy conservation mode for HVAC is provided by the present invention through incorporating a thermostat and associated controller unit (collectively "thermostat" or TCU) 400 (FIG. 5A) with the master controller 10 such that when the master controller 10 is in a deactivated state (unoccupied room), the TCU 400 maintains an unoccupied room HVAC control. Preferably, the TCU automatically shifts between heating and cooling operation as needed. In contrast, upon master controller 10 activation by a room occupant, the HVAC control is transferred to a room occupant regulatable thermostat with the same TCU 400. The TCU 400 may be in the form of a discrete modular unit that includes an RF receiver and HVAC control circuitry capable of controlling operation of the HVAC system in response to receiving an RF transmission from a master controller and according to preset conditions.

Figure 5A:
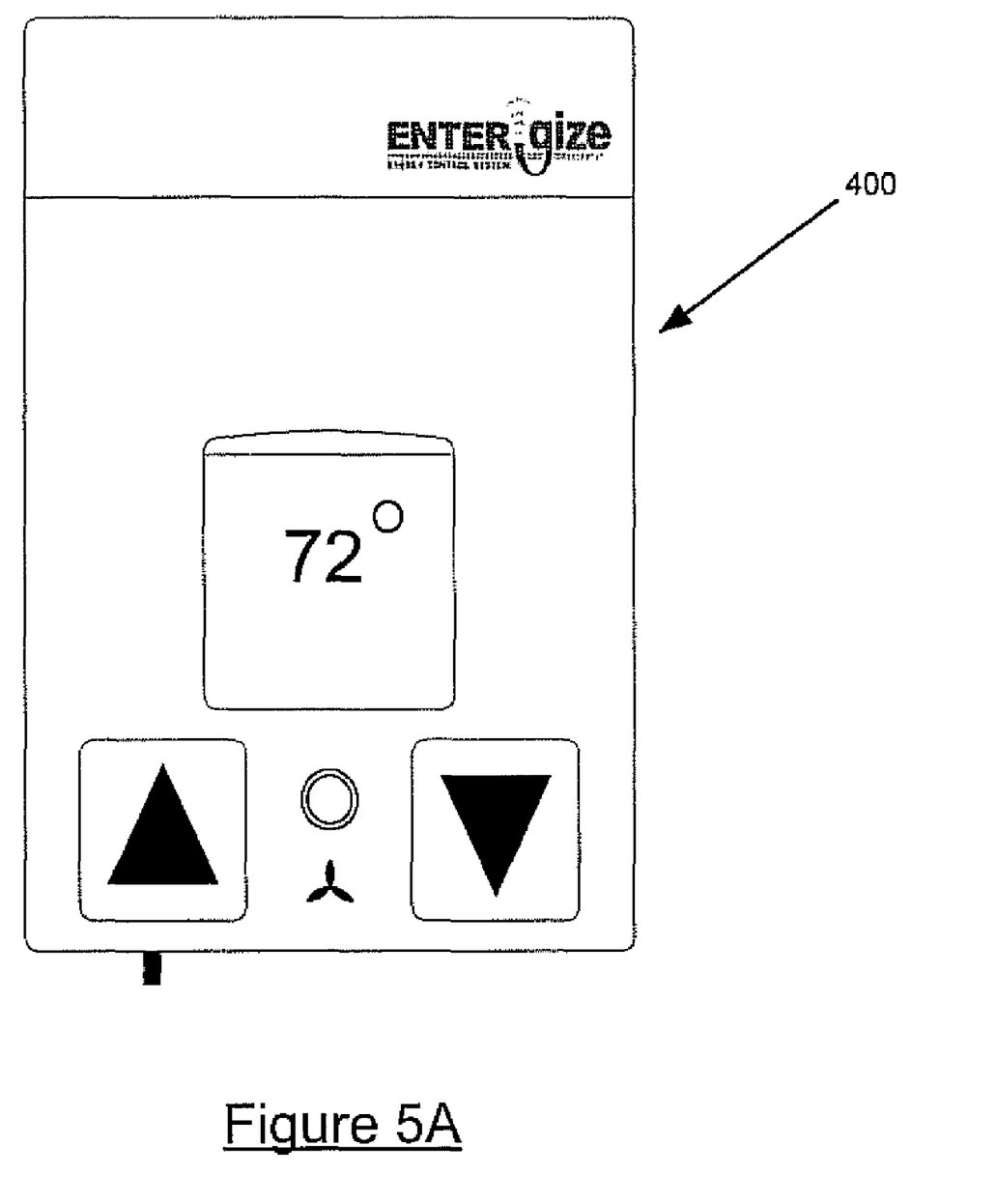
FIG. 5A illustrates a perspective view various views of a thermal control unit according to the present invention.
Figure 5B:
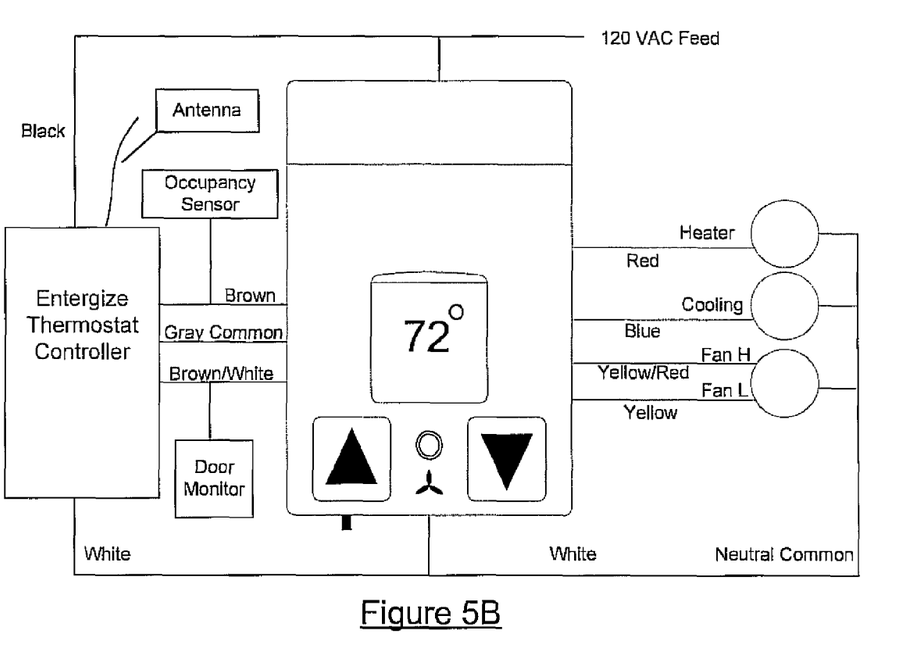
FIG. 5B illustrates a wiring diagram for a four pipe HVAC system.
Figure 5C:
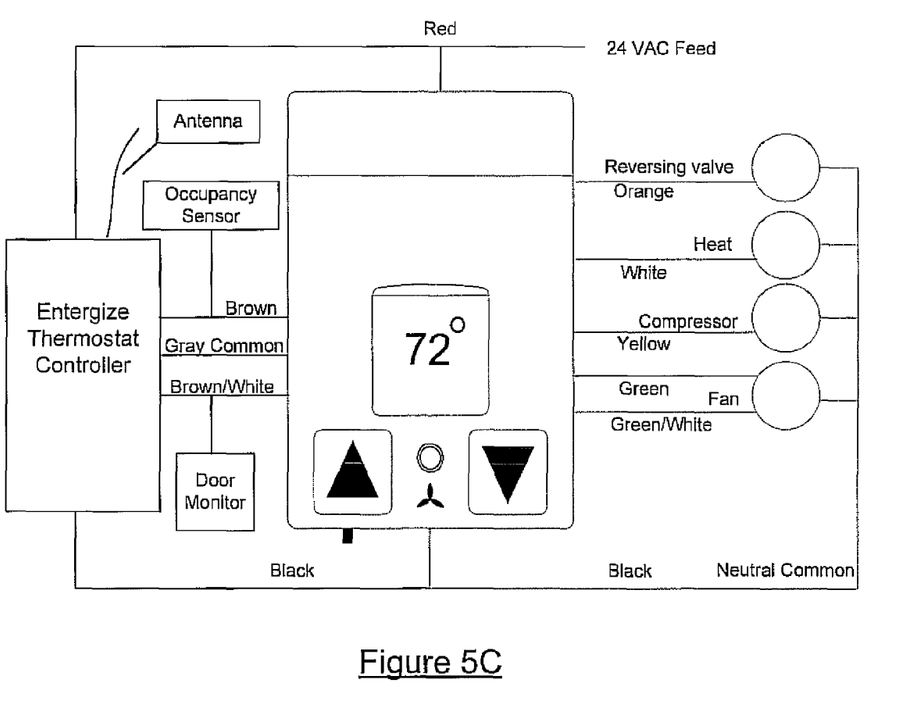
FIG. 5C illustrates a wiring diagram for a packaged terminal air conditioning (PTAC) system.

The modular TCU 400 can be set to one of a plurality of control ranges that operate to limit the climate conditions within a room within the selected control range. Each control range includes distinct climate conditions to be maintained when the room is either occupied or unoccupied. An illustrative example being that when a room is occupied, the climate conditions within the room are limited between 67-76° F. while an unoccupied room might have climate limit conditions between 62-78° F. FIGS. 5A and 5B schematically illustrate the sub-circuits within the TCU 400 that include a dip switch used for selecting the mode of operation of the unit, an R-F receiver circuit, and a plurality of SPST relays which operate to open and close the control circuits to the existing HVAC system for a four pipe and PTAC control unit 600 (FIG. 7), respectively. It is appreciated that incorporating a microprocessor into the present invention affords greater system programmability and flexibility in operation. For instance, seasonal or diurnal controller adjustments are facilitated in this way.

Optionally, the master controller 10 is powered not by line voltage by rather by battery power. It is appreciated that a battery powered master controller 10 is particularly well suited for cooperation with a conventional magnetic key card, slider or any key card. The battery powered master controller 10 includes a radial for the purpose of transmission of radio frequency signals denoting "occupied" or "unoccupied" room condition based on the presence or absence of a magnetic key card within a receiver, respectively; or alternatively slider switch position between these binary conditions. The battery provides power to the control electronics and the radio. FIGS. 8A and 8C illustrate a front view and a side view, respectively of a key card/mini key card insertion aperture 32 prime. It is appreciated that this configuration of parallel insertion aperture 32 prime relative to the master controller face plate is suitable for usage with a line power activated master controller as well as a battery powered master controller. The aperture 32 prime being configured to accept a preselected key card. With insertion of a magnetic key card/mini key card into an aperture 32 prime, a signal is communicated to the master controller electronics that the room is now in "occupied" mode. A radio frequency signal is sent to various slave components in the inventive system. Exemplary slave components of the inventive system are depicted in FIGS. 1 and 7.

Figure 8B:
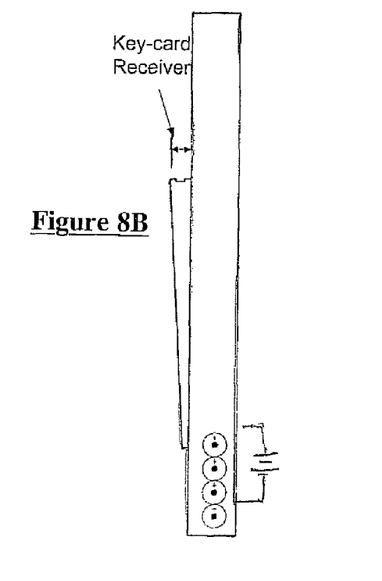
Figure 8C:
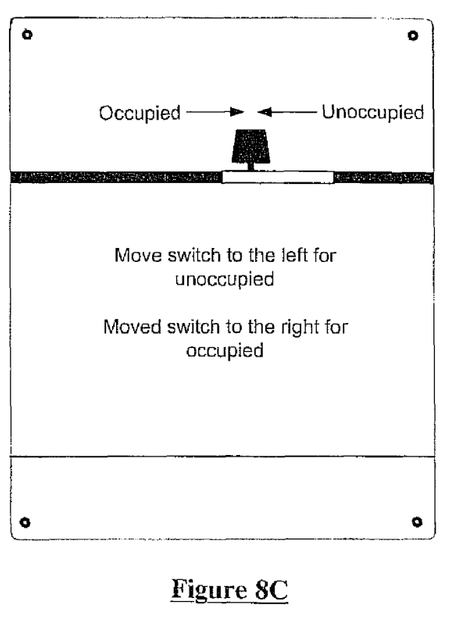

In FIG. 8B, a slide switch is provided that has two positions corresponding to "occupied" and "unoccupied". Based on the occupancy status of the room, control of the various slave components of the inventive system is retained by the master controller or surrendered to the room occupant.

Figure 6:
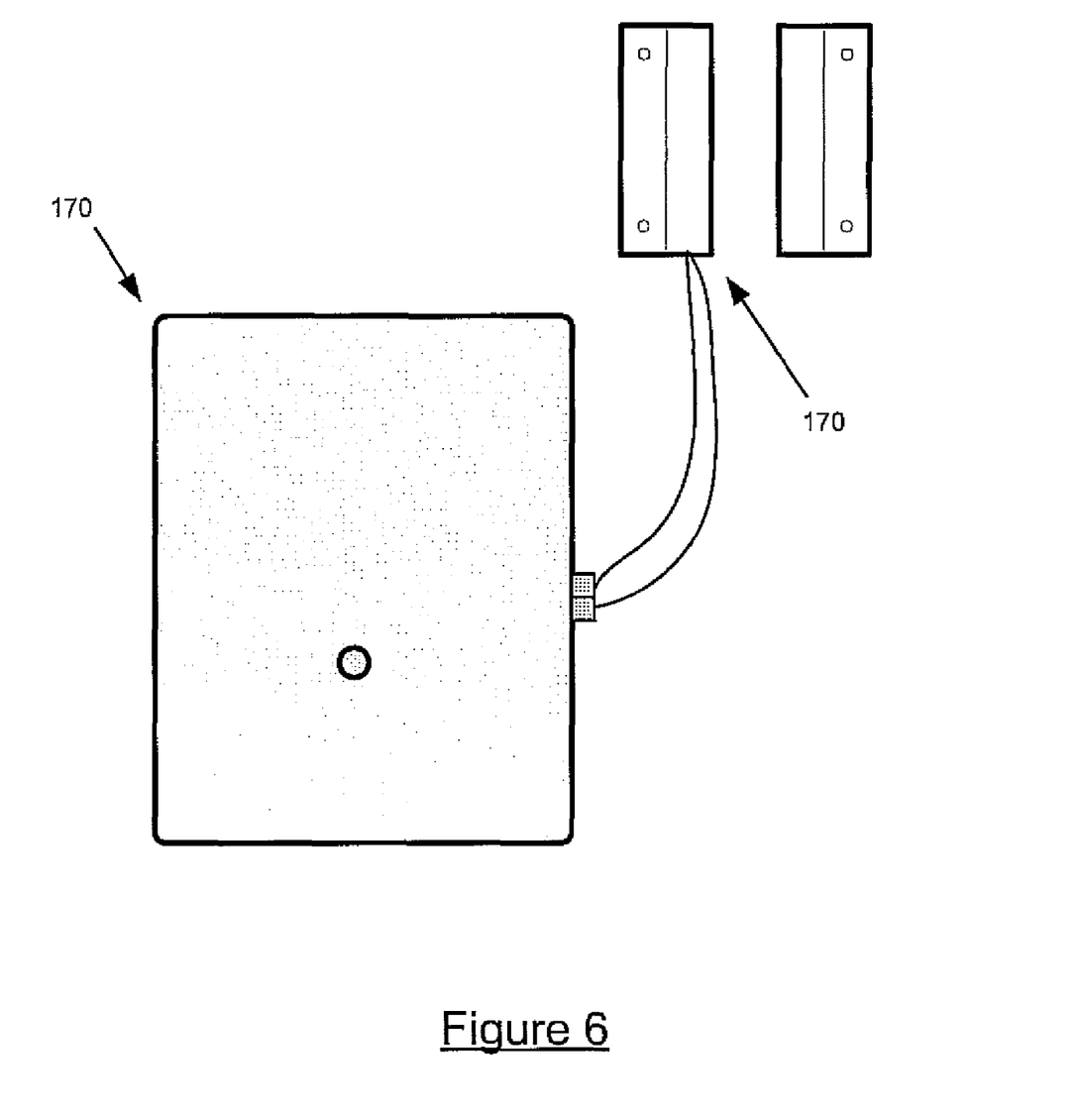
FIG. 6 illustrates a perspective view of a sliding door or window monitor according to the present invention.

Optionally included within the energy control system can be a door or window monitor 170 as shown in FIG. 6. In some instances, the door or window monitor 170 is a sliding balcony door or window monitor having sensor 172. The sensor 172 can be any sensor known to those skilled in the art for detecting when a window or door is opened and closed, illustratively including electromagnetic sensors, infrared sensors, ultrasonic sensors and the like. The monitor 170 includes an RF transceiver that can send an open or closed door/window signal to the TCU 400. In this manner when a balcony door or window is opened, the monitor 170 signals the TCU 400 that the balcony door or window is open and thereby afford for the TCU 400 to de-energize the HVAC system or in the alternative afford for He TCU 400 to control the HVAC system with a set of parameters selected for when an occupant opens a balcony door or a window.

In operation, the present invention upon activation by a room occupant, the master controller transmits a signal to the radio frequency receiver thereby activating the electrical outlet. Upon the room occupant, or final room occupant when a group is present, vacating the room, the an unoccupied state is sent from the master controller thereby terminating the radio frequency emissions from the master controller that in turn deactivates the remote outlet through the termination of receipt of the activating radio frequency. In a preferred embodiment, the master controller operates to afford continued radio frequency emission for a limited period of time after deactivation. The limited time of continued activation is typically between a few seconds and a few minutes.

One skilled in the art to which the invention pertains will readily appreciate that various modifications of the present invention as detailed herein are possible without departing from the spirit of the invention.

The invention claimed is:

1. An energy conservation system comprising:
   a master controller providing control of power consumption to an occupant of a room through occupant action to create an occupied mode and otherwise be in an unoccupied mode;
   a thermostat controlled by said master controller;
   a master radio frequency transceiver located within said master controller and having a broadcast range; a second radio frequency transceiver remote from the master radio frequency transceiver and coupled to an electrical switching circuit responsive to a radio frequency signal received from said master radio frequency transceiver;
   a controlled power device coupled to the electrical switching circuit such that an energy input to said device is controlled by said master controller in the unoccupied mode wherein the room occupant action that activates said master controller is insertion of a card into said master controller or the activation of a slide switch;
   wherein said thermostat is in two-way radio frequency communication with said master controller; and
   wherein said second radio frequency transceiver following a successful receipt of the radio frequency signal with a command from the master controller provides a verification of the received command that is rebroadcast via a separate radio frequency to the master controller.

2. The energy conservation system of claim 1 wherein said controlled power device is a HVAC system having an unoccupied mode preselected temperature, said thermostat operating said HVAC system towards the unoccupied mode preselected temperature in the unoccupied mode.

3. The system of claim 2 wherein said HVAC system is a packaged terminal air conditioner.

4. The system of claim 1 wherein said controlled power device is less than all of a plurality of receptacles of a wall plug.

5. The system of claim 1 wherein said controlled power device is a HVAC system and further comprising a door or window monitor in communication with said master controller to de-energize said HVAC system when a door or window is open.

6. The system of claim 1 wherein said master controller is positioned by an entry door to and within a patron lodging room.

7. The system of claim 1 wherein said master controller has an aperture defining an entry to a pocket adapted to receive a keycard or mini-keycard.

8. The system of claim 1 wherein the master radio frequency transceiver further comprises a frequency modulation switch that allows for the transmitted frequency to be varied.

9. The system of claim 1 wherein said master controller is battery powered.

10. A process of room energy conservation comprising:
   removing a keycard or mini-keycard or moving a slide switch to place power consumption under control of a master controller within a room in an unoccupied mode;
   sending a radio frequency signal from a transmitter within said master controller to a radio frequency transceiver coupled to an electrical switching circuit within a controlled power device;
   de-activating said controlled power device in response to the radio frequency signal being received by the radio frequency transceiver, said signal indicating the unoccupied mode to provide room energy conservation;
   monitoring the room for an open door or window to communicate an open signal to said master controller and de-energizing a HVAC system in response to the open signal;
   wherein the open signal is communicated by a battery-powered transceiver capable of two-way communication
   wherein said radio frequency transceiver following a successful receipt of the radio frequency signal with a command from the master controller provides a verification of the received command that is rebroadcast via a separate radio frequency to the master controller.

11. The process of claim 10 further comprising: modulating a thermostat control unit with the radio frequency signal to operate the HVAC system towards an unoccupied preselected temperature.

12. The process of claim 10 wherein the radio frequency transceiver is associated with a balcony sliding door.

13. The process of claim 10 wherein the electrical switching circuit is a relay.

14. The process of claim 10 further comprising overriding said master controller in the unoccupied state.

* * * * *